(12) United States Patent
Donatsch et al.

(10) Patent No.: US 11,803,231 B2
(45) Date of Patent: Oct. 31, 2023

(54) EXPRESSION PREDICTION USING IMAGE-BASED MOVEMENT METRIC

(71) Applicant: Magic Leap, Inc., Plantation, FL (US)

(72) Inventors: Daniel Jürg Donatsch, Zug (CH); Srivignesh Rajendran, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 217 days.

(21) Appl. No.: 17/234,787

(22) Filed: Apr. 19, 2021

(65) Prior Publication Data

US 2021/0326583 A1 Oct. 21, 2021

Related U.S. Application Data

(60) Provisional application No. 63/012,579, filed on Apr. 20, 2020.

(51) Int. Cl.
*G06F 3/01* (2006.01)
*G06N 3/08* (2023.01)
(Continued)

(52) U.S. Cl.
CPC ............. *G06F 3/011* (2013.01); *G06F 3/012* (2013.01); *G06F 18/214* (2023.01); *G06F 18/217* (2023.01); *G06F 18/2163* (2023.01); *G06N 3/04* (2013.01); *G06N 3/08* (2013.01); *G06V 40/176* (2022.01); *G06V 40/193* (2022.01); *G06V 40/20* (2022.01); *G06F 3/013* (2013.01)

(58) Field of Classification Search
CPC ........ G06F 3/011; G06F 3/012; G06F 18/214; G06F 18/2163; G06F 18/217; G06F 3/013; G06F 2203/011; G06N 3/04; G06N 3/08; G06N 3/084; G06V 40/176; G06V 40/193; G06V 40/20; G02B 27/0093; G02B 2027/0138; G02B 2027/014; G02B 27/0172
USPC ....................................................... 382/103
See application file for complete search history.

(56) References Cited

U.S. PATENT DOCUMENTS 9,696,859 B1 * 7/2017 Heller ................... G06F 1/1694
2015/0324632 A1 11/2015 Whitehill et al.
(Continued)

OTHER PUBLICATIONS

International Application No. PCT/US2021/028033, International Search Report and Written Opinion, dated Aug. 4, 2021, 7 pages.
(Continued)

*Primary Examiner* — Juan A Torres
(74) *Attorney, Agent, or Firm* — KILPATRICK TOWNSEND & STOCKTON LLP

(57) ABSTRACT

Techniques are disclosed for training a machine learning model to predict user expression. A plurality of images are received, each of the plurality of images containing at least a portion of a user's face. A plurality of values for a movement metric are calculated based on the plurality of images, each of the plurality of values for the movement metric being indicative of movement of the user's face. A plurality of values for an expression unit are calculated based on the plurality of values for the movement metric, each of the plurality of values for the expression unit corresponding to an extent to which the user's face is producing the expression unit. The machine learning model is trained using the plurality of images and the plurality of values for the expression unit.

20 Claims, 12 Drawing Sheets

(51) Int. Cl.
  *G06N 3/04*    (2023.01)
  *G06V 40/16*   (2022.01)
  *G06V 40/20*   (2022.01)
  *G06F 18/214*  (2023.01)
  *G06F 18/21*   (2023.01)
  *G06V 40/18*   (2022.01)

(56) References Cited

U.S. PATENT DOCUMENTS

| | | |
|---|---|---|
| 2018/0081434 A1* | 3/2018 | Siddiqui ............... G06V 40/20 |
| 2018/0303397 A1 | 10/2018 | Krupat et al. |
| 2018/0314881 A1 | 11/2018 | Sud et al. |
| 2019/0029528 A1* | 1/2019 | Tzvieli ................ A61B 5/6814 |
| 2019/0138096 A1 | 5/2019 | Lee et al. |
| 2019/0285881 A1 | 9/2019 | Ilic et al. |
| 2019/0387168 A1* | 12/2019 | Smith .................... G06F 3/013 |
| 2021/0133483 A1* | 5/2021 | Prabhu ................ G06V 10/454 |

OTHER PUBLICATIONS

Hickson, et al., "Eyemotion: Classifying facial expression in VR using eye-tracking cameras", https://arxiv.org/abs/1707.07204, Jul. 28, 2017, 10 pages.
Application No. PCT/US2021/028033 , "International Preliminary Report on Patentability", dated Nov. 3, 2022, 6 pages.
Application No. EP21793045.2, Extended European Search Report, dated Jul. 28, 2023, 8 pages.
Zafeiriou et al., "Deep Analysis of Facial Behavioral Dynamics", 2017 IEEE Conference on Computer Vision and Pattern Recognition Workshops, Jul. 21, 2017, pp. 42-50.

\* cited by examiner

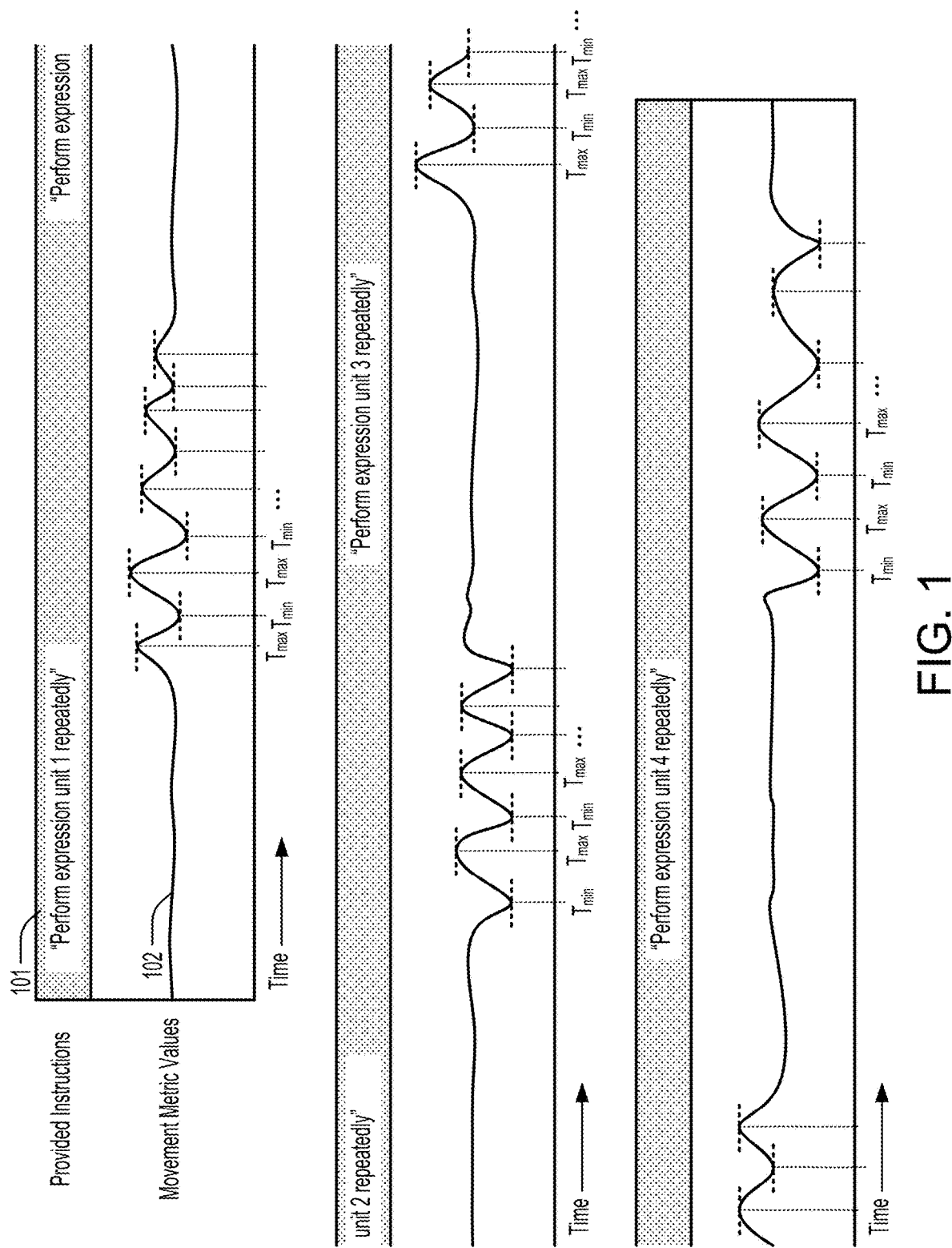

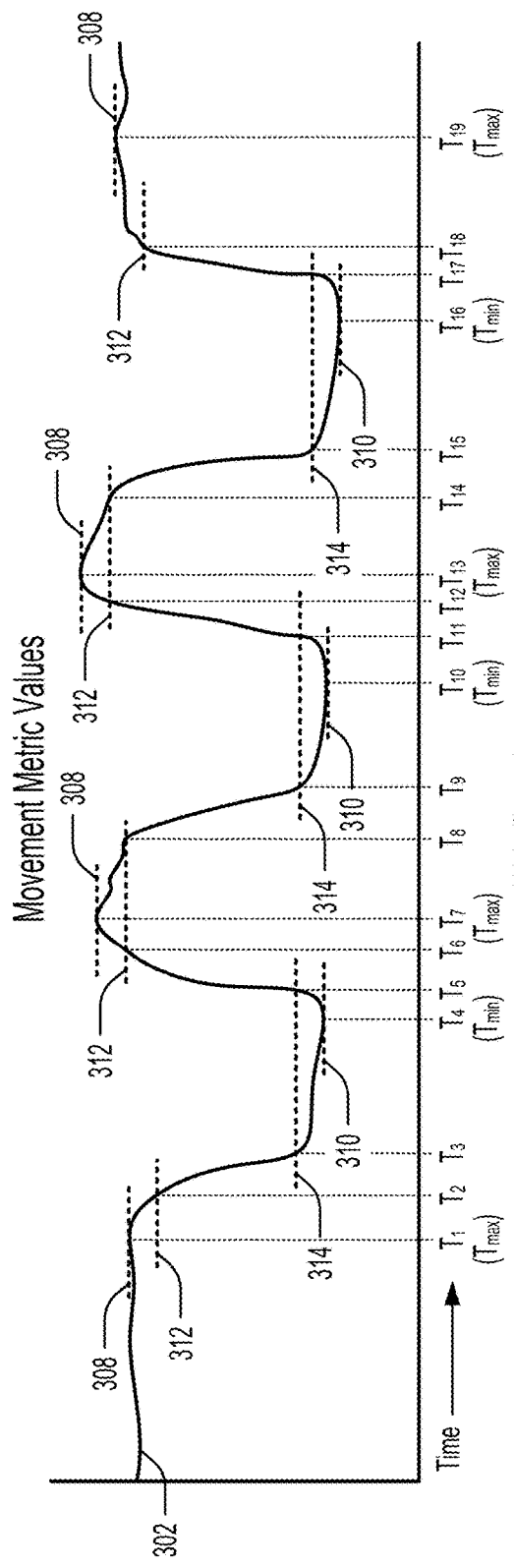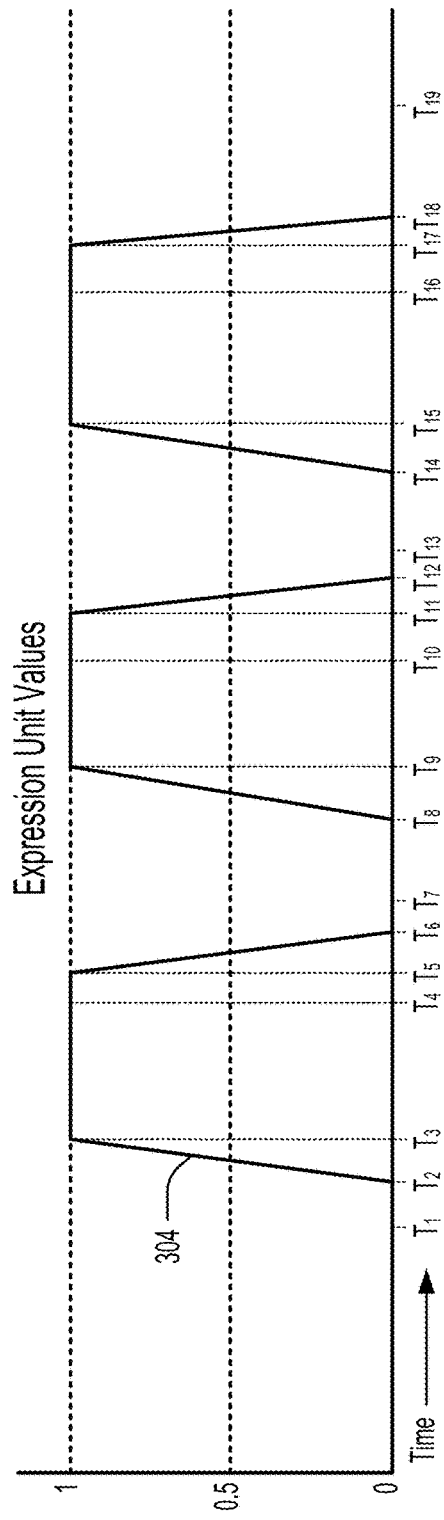

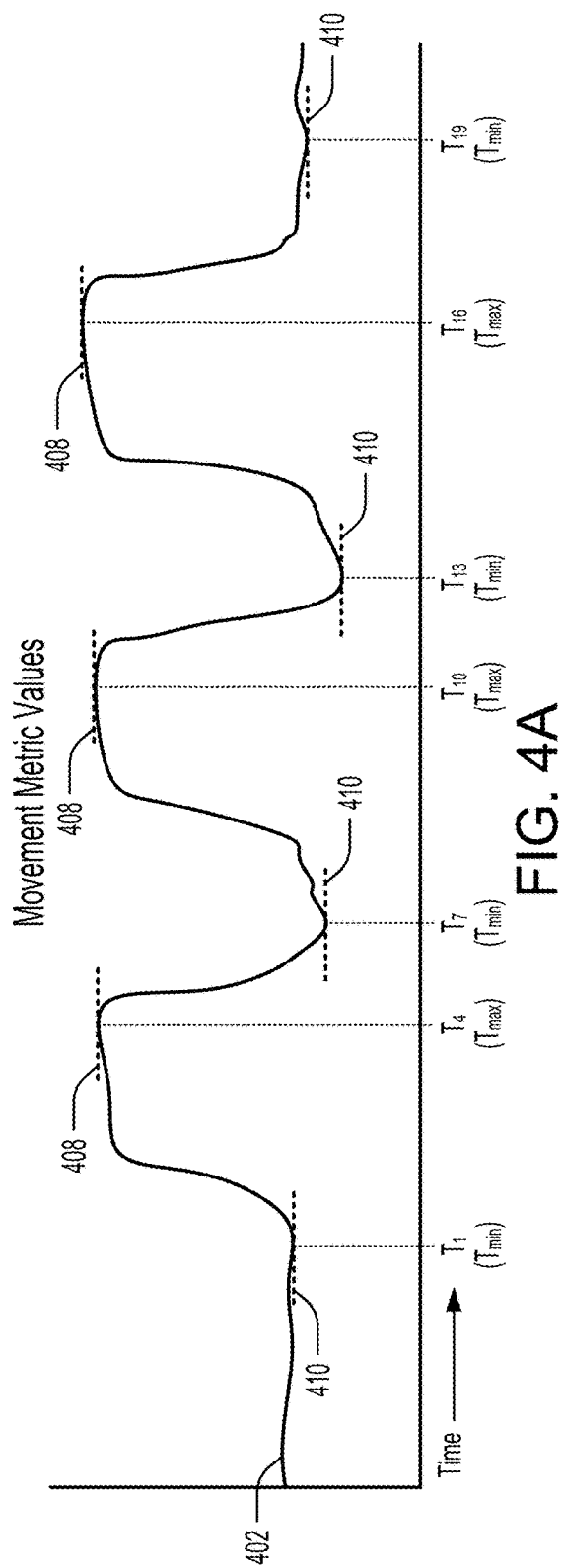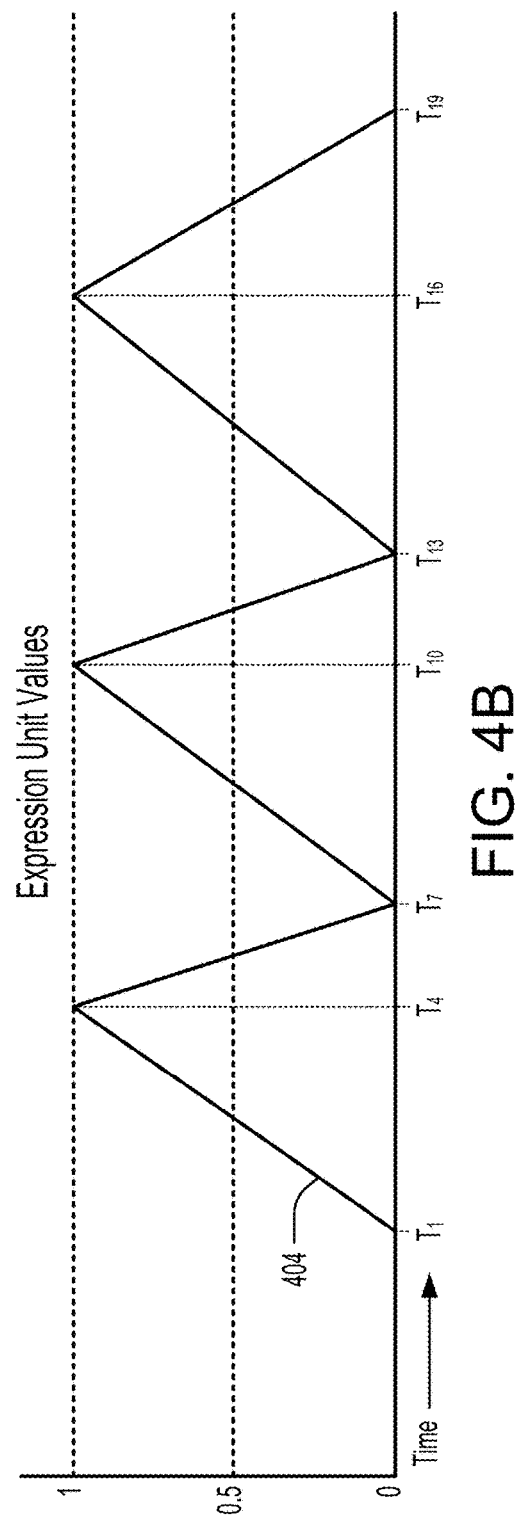
FIG. 4A
FIG. 4B

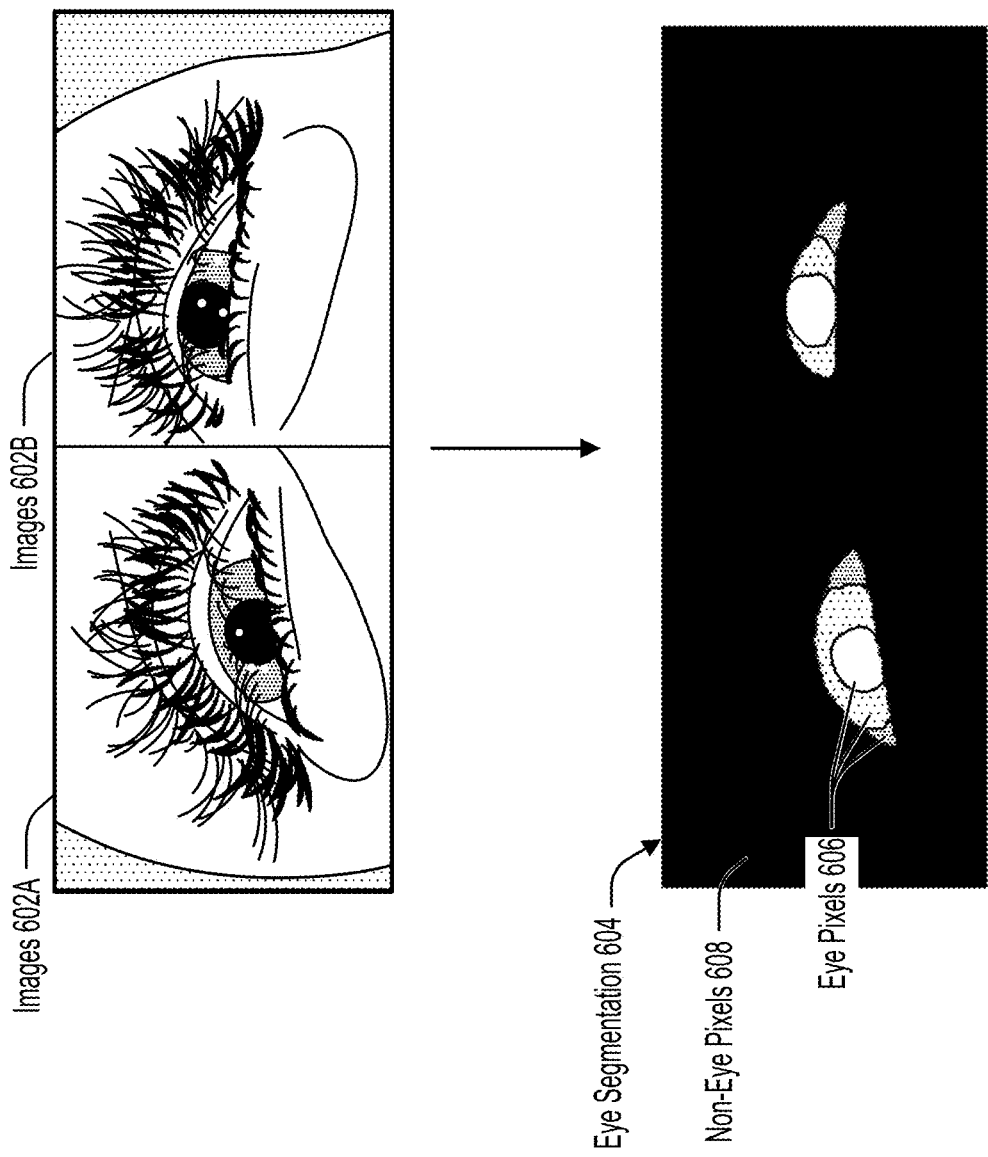

EXPRESSION PREDICTION USING IMAGE-BASED MOVEMENT METRIC

CROSS-REFERENCES TO RELATED APPLICATIONS

This application claims the benefit of priority to U.S. Provisional Patent Application No. 63/012,579, filed Apr. 20, 2020, entitled "EXPRESSION PREDICTION USING IMAGE-BASED MOVEMENT METRIC," the entire content of which is incorporated herein by reference for all purposes.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to techniques for improving the performance and user experience of optical systems. More particularly, embodiments of the present disclosure provide systems and methods for predicting user expression based on images of a user's face. Although the present invention is often described in reference to an augmented reality (AR) device, the disclosure is applicable to a variety of applications.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of training a machine learning model to predict user expression, the method comprising: receiving a plurality of images, each of the plurality of images containing at least a portion of a user's face; calculating a plurality of values for a movement metric based on the plurality of images, each of the plurality of values for the movement metric being indicative of movement of the user's face; calculating a plurality of values for an expression unit based on the plurality of values for the movement metric, each of the plurality of values for the expression unit corresponding to an extent to which the user's face is producing the expression unit; and training the machine learning model using the plurality of images and the plurality of values for the expression unit by: generating, by the machine learning model, training output data based on the plurality of images; and modifying the machine learning model based on the plurality of values for the expression unit and the training output data.

Example 2 is the method of example(s) 1, wherein the training output data includes a plurality of output values for each of a set of expression units, the expression unit being a first expression unit from the set of expression units.

Example 3 is the method of example(s) 2, wherein the set of expression units includes at least one of: inner brow raiser, outer brow raiser, brow lowerer, upper lid raiser, cheek raiser, lid tightener, nose wrinkler, eyes closed, left eye wink, or right eye wink.

Example 4 is the method of example(s) 1-3, wherein training the machine learning model using the plurality of images and the plurality of values for the expression unit further includes: performing a comparison of the plurality of values for the expression unit to a plurality of output values for the expression unit of the training output data; and generating error data based on the comparison, wherein the machine learning model is modified based on the error data.

Example 5 is the method of example(s) 1-4, wherein the machine learning model is an artificial neural network having a set of adjustable parameters.

Example 6 is the method of example(s) 1-5, wherein the movement metric is a number of eye pixels, and wherein calculating the plurality of values for the movement metric based on the plurality of images includes: segmenting each of the plurality of images such that each of the plurality of images includes eye pixels and non-eye pixels; counting the number of eye pixels in each of the plurality of images; and setting each of the plurality of values for the movement metric equal to the number of eye pixels in a corresponding image from the plurality of images.

Example 7 is the method of example(s) 1-6, wherein calculating the plurality of values for the expression unit based on the plurality of values for the movement metric includes: identifying first extrema values in the plurality of values for the movement metric and first corresponding images for which the first extrema values are identified; setting each of the plurality of values for the expression unit that are associated with the first corresponding images equal to one; identifying second extrema values in the plurality of values for the movement metric and second corresponding images for which the second extrema values are identified; setting each of the plurality of values for the expression unit that are associated with the second corresponding images equal to zero; and setting each remaining value of the plurality of values by interpolating between zero and one.

Example 8 is a non-transitory computer-readable medium comprising instructions that, when executed by one or more processors, cause the one or more processors to perform operations comprising: receiving a plurality of images, each of the plurality of images containing at least a portion of a user's face; calculating a plurality of values for a movement metric based on the plurality of images, each of the plurality of values for the movement metric being indicative of movement of the user's face; calculating a plurality of values for an expression unit based on the plurality of values for the movement metric, each of the plurality of values for the expression unit corresponding to an extent to which the user's face is producing the expression unit; and training a machine learning model using the plurality of images and the plurality of values for the expression unit by: generating, by the machine learning model, training output data based on the plurality of images; and modifying the machine learning model based on the plurality of values for the expression unit and the training output data.

Example 9 is the non-transitory computer-readable medium of example(s) 8, wherein the training output data includes a plurality of output values for each of a set of expression units, the expression unit being a first expression unit from the set of expression units.

Example 10 is the non-transitory computer-readable medium of example(s) 9, wherein the set of expression units includes at least one of: inner brow raiser, outer brow raiser, brow lowerer, upper lid raiser, cheek raiser, lid tightener, nose wrinkler, eyes closed, left eye wink, or right eye wink.

Example 11 is the non-transitory computer-readable medium of example(s) 8-10, wherein training the machine learning model using the plurality of images and the plurality of values for the expression unit further includes: performing a comparison of the plurality of values for the expression unit to a plurality of output values for the expression unit of the training output data; and generating error data based on the comparison, wherein the machine learning model is modified based on the error data.

Example 12 is the non-transitory computer-readable medium of example(s) 8-11, wherein the machine learning model is an artificial neural network having a set of adjustable parameters.

Example 13 is the non-transitory computer-readable medium of example(s) 8-12, wherein the movement metric is a number of eye pixels, and wherein calculating the plurality of values for the movement metric based on the plurality of images includes: segmenting each of the plurality of images such that each of the plurality of images includes eye pixels and non-eye pixels; counting the number of eye pixels in each of the plurality of images; and setting each of the plurality of values for the movement metric equal to the number of eye pixels in a corresponding image from the plurality of images.

Example 14 is the non-transitory computer-readable medium of example(s) 8-13, wherein calculating the plurality of values for the expression unit based on the plurality of values for the movement metric includes: identifying first extrema values in the plurality of values for the movement metric and first corresponding images for which the first extrema values are identified; setting each of the plurality of values for the expression unit that are associated with the first corresponding images equal to one; identifying second extrema values in the plurality of values for the movement metric and second corresponding images for which the second extrema values are identified; setting each of the plurality of values for the expression unit that are associated with the second corresponding images equal to zero; and setting each remaining value of the plurality of values by interpolating between zero and one.

Example 15 is a system comprising: one or more processors; and a non-transitory computer-readable medium comprising instructions that, when executed by the one or more processors, cause the one or more processors to perform operations comprising: receiving a plurality of images, each of the plurality of images containing at least a portion of a user's face; calculating a plurality of values for a movement metric based on the plurality of images, each of the plurality of values for the movement metric being indicative of movement of the user's face; calculating a plurality of values for an expression unit based on the plurality of values for the movement metric, each of the plurality of values for the expression unit corresponding to an extent to which the user's face is producing the expression unit; and training a machine learning model using the plurality of images and the plurality of values for the expression unit by: generating, by the machine learning model, training output data based on the plurality of images; and modifying the machine learning model based on the plurality of values for the expression unit and the training output data.

Example 16 is the system of example(s) 15, wherein the training output data includes a plurality of output values for each of a set of expression units, the expression unit being a first expression unit from the set of expression units.

Example 17 is the system of example(s) 16, wherein the set of expression units includes at least one of: inner brow raiser, outer brow raiser, brow lowerer, upper lid raiser, cheek raiser, lid tightener, nose wrinkler, eyes closed, left eye wink, or right eye wink.

Example 18 is the system of example(s) 15-17, wherein training the machine learning model using the plurality of images and the plurality of values for the expression unit further includes: performing a comparison of the plurality of values for the expression unit to a plurality of output values for the expression unit of the training output data; and generating error data based on the comparison, wherein the machine learning model is modified based on the error data.

Example 19 is the system of example(s) 15-18, wherein the movement metric is a number of eye pixels, and wherein calculating the plurality of values for the movement metric based on the plurality of images includes: segmenting each of the plurality of images such that each of the plurality of images includes eye pixels and non-eye pixels; counting the number of eye pixels in each of the plurality of images; and setting each of the plurality of values for the movement metric equal to the number of eye pixels in a corresponding image from the plurality of images.

Example 20 is the system of example(s) 15-19, wherein calculating the plurality of values for the expression unit based on the plurality of values for the movement metric includes: identifying first extrema values in the plurality of values for the movement metric and first corresponding images for which the first extrema values are identified; setting each of the plurality of values for the expression unit that are associated with the first corresponding images equal to one; identifying second extrema values in the plurality of values for the movement metric and second corresponding images for which the second extrema values are identified; setting each of the plurality of values for the expression unit that are associated with the second corresponding images equal to zero; and setting each remaining value of the plurality of values by interpolating between zero and one.

Numerous benefits are achieved by way of the present disclosure over conventional techniques. For example, embodiments described herein allow prediction of a user's expression using only a portion of the user's face, which has useful applications in head-mounted systems such as AR systems. Embodiments described herein further allow for training of a machine learning model to predict user expression that can be tailored to be user specific or be used by any user. For example, the machine learning model can first be trained for all users, and then further calibration and fine tuning of the training can be performed by an end user upon receiving the device, prior to each use of the device, and/or periodically based on the needs of the user.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIG. 1 illustrates example instructions and corresponding movement metric values that may be detected for training a machine learning model to predict user expression.

FIGS. 3A and 3B illustrate an example calculation of expression unit values based on movement metric values.

FIGS. 4A and 4B illustrate an example calculation of expression unit values based on movement metric values.

FIG. 6 illustrates an example implementation in which the number of eye pixels in an image is used as a movement metric.

DETAILED DESCRIPTION OF SPECIFIC EMBODIMENTS

Figure 2A:
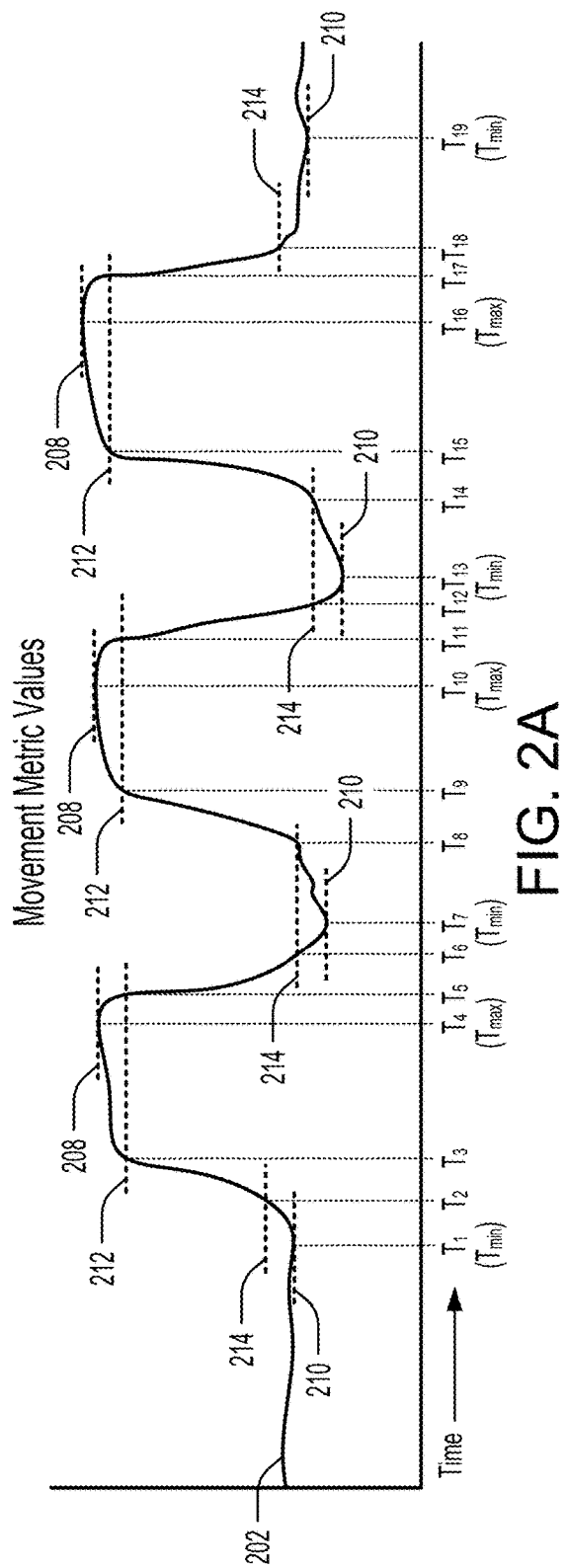
FIGS. 2A and 2B illustrate an example calculation of expression unit values based on movement metric values.

Predicting an expression of a user is useful in various applications. For example, the ability to detect a user's expression (and accordingly the user's emotional state) can allow a computing system to communicate with the user based on the perceived needs of the user, thereby allowing the computing system to offer relevant information to the user. In the augmented reality (AR) or virtual reality (VR) context, detecting user expression can facilitate the animation of avatars and other digital characters. For example, the expressions produced by the user's avatar in the digital world may be immediately responsive to the user's expressions in the real world.

While much of the previous research has been directed toward the prediction of a user's expressions based on images of the user's entire face, predictions based on images of only a portion of the user's face, such as the user's eye, are substantially more complex. For example, certain facial expressions may cause only subtle changes to the eyes while changes to other portions of the user's face, such as the user's mouth, may be more pronounced. These subtle changes may be difficult to detect as well as difficult to link to a particular user expression. Given the limited field of view of cameras in many applications, particularly in AR/VR applications in which an eye tracking camera is employed, there is a significant need for robust methods for predicting user expression based on images of only a portion of a user's face.

Embodiments described herein provide systems and methods for training a machine learning model to predict user expression. Specifically, the machine learning model may be trained to generate a set of fractional values representing different facial movements when provided with an input image of the user's face (e.g., the user's eye). The different facial movements may be referred to as expression units, and values generated by the machine learning model for each of the expression units may be referred to as expression unit values. In some instances, each of the expression unit values may range between zero and one, with zero corresponding to the user producing the expression unit to a minimum extent and one corresponding to the user producing the expression unit to a maximum extent.

In some embodiments, the different expression units may be facial action coding system (FACS) action units, which are a widely-used taxonomy for facial movements. Each of the FACS action units corresponds to a different contraction or relaxation of one or more muscles in a user's face. Combinations of action units may contribute to a user showing a particular emotion. For example, a user may show a "happiness" emotion when the user is producing a cheek raiser (Action Unit 6) and a lip corner puller (Action Unit 12). As another example, a user may show a "sadness" emotion when the user is producing an inner brow raiser (Action Unit 1), a brow lowerer (Action Unit 4), and a lip corner depressor (Action Unit 15).

To train the machine learning model using a series of images, a set of expression unit values generated for each image are compared to ground truth data, which may include a different set of expression unit values (or a single expression unit value) calculated based on a movement metric for the series of images. To distinguish the two sets of expression unit values, the values generated by the machine learning model may be referred to as output values. For each image, error data may be generated by comparing an output value to an expression unit value calculated using a movement metric value for the image. The machine learning model is then modified using the error data by, for example, adjusting the weights associated with the machine learning model so as to generate more accurate output values during subsequent inferences.

FIG. 1 illustrates example instructions 101 and corresponding movement metric values 102 that may be detected for training a machine learning model to predict user expression, in accordance with some embodiments of the present invention. Instructions 101 may be provided to a user so as to instruct the user to produce one or more expression units. While the user is producing the expression units, a camera captures images of the user's face (or a portion thereof, such as the user's eye). The captured images are analyzed to extract movement metric values 102 for a particular movement metric associated with the user's face.

In some examples, the user is wearing an AR/VR headset. The headset may include a camera with a field of view that includes at least a portion of the user's face, such as one or both of the user's eye. Such a camera may be referred to as an eye tracking camera, which is often employed in AR/VR headsets. In some examples, a camera may capture images of the user's entire face while the user is provided with instructions and the images may be cropped to reduce the images to a desired region, such as the user's eye. Alternatively, the camera may directly capture images of the desired region by focusing or zooming onto the user's eye. Accordingly, embodiments of the present invention may include scenarios in which a user is or is not wearing a head-mounted device.

While instructions 101 are shown in FIG. 1 as written instructions, instructions 101 may include audible instructions played over a speaker in the AR/VR headset or over a remote speaker, visual instructions displayed at the AR/VR headset or on a remote display device, among other possibilities. For example, during a calibration step of the AR/VR headset, the headset may generate virtual content showing either written instructions or examples of a virtual character demonstrating different expression units. The user may see these visual instructions and thereafter produce the indicated expression unit.

In the illustrated example, the user is first provided with an instruction to "Perform expression unit 1 repeatedly". In the present example, "expression unit 1" may correspond to an inner brow raiser. The user then repeatedly produces the inner brow raiser a number of times while images are captured of the user's face. The images are analyzed to detect movement metric values 102 indicating movement of the user's face while they produce the inner brow raiser. Movement metric values 102 may be analyzed to identify maximum and minimum values (and their corresponding time stamps $T_{max}$ and $T_{min}$, respectively).

Time stamps $T_{max}$ and $T_{min}$ may be used to identify images of interest and to produce ground truth values for training the machine learning model. For example, the corresponding images at which movement metric values 102 is at a relative maximum value (at timestamps $T_{max}$) may be when the user is fully producing the inner brow raiser, the corresponding images at which movement metric values 102 is at a relative minimum value (at timestamps $T_{min}$) may be when the user is producing the inner brow raiser at a minimum amount, and the images therebetween may be when the user is partially producing the inner brow raiser. As such, different expression unit values may be calculated based on movement metric values 102. For example, an expression unit value of one may be calculated for a relative maximum movement metric value, an expression unit value of zero may be calculated for a relative minimum movement metric value, and expression unit values between zero and one may be interpolated (e.g., linearly) between maximum and minimum movement metric values.

Continuing with the illustrated example, the user is next provided with an instruction to "Perform expression unit 2 repeatedly". In the present example, "expression unit 2" may correspond to a brow lowerer. The user then repeatedly produces the brow lowerer a number of times while images are captured of the user's face, which are analyzed to detect movement metric values 102 from which maximum and minimum values and corresponding time stamps $T_{max}$ and $T_{min}$ are identified. In contrast to the inner brow raiser, the corresponding images at which movement metric values 102 is at a relative minimum value (at timestamps $T_{min}$) may be when the user is fully producing the brow lowerer and the corresponding images at which movement metric values 102 is at a relative maximum value (at timestamps $T_{max}$) may be when the user is producing the brow lowerer at a minimum amount. As such, an expression unit value of one may be calculated for a relative minimum movement metric value and an expression unit value of zero may be calculated for a relative maximum movement metric value.

The user is next provided with an instruction to "Perform expression unit 3 repeatedly". In the present example, "expression unit 3" may correspond to a lid tightener. The user then repeatedly produces the lid tightener a number of times while images are captured of the user's face, which are analyzed to detect movement metric values 102 from which maximum and minimum values and corresponding time stamps $T_{max}$ and $T_{min}$ are identified. Lastly, the user is provided with an instruction to "Perform expression unit 4 repeatedly". In the present example, "expression unit 4" may correspond to an upper lid raiser. The user then repeatedly produces the upper lid raiser a number of times while images are captured of the user's face, which are analyzed to detect movement metric values 102 from which maximum and minimum values and corresponding time stamps $T_{max}$ and $T_{min}$ are identified.

Figure 2B:
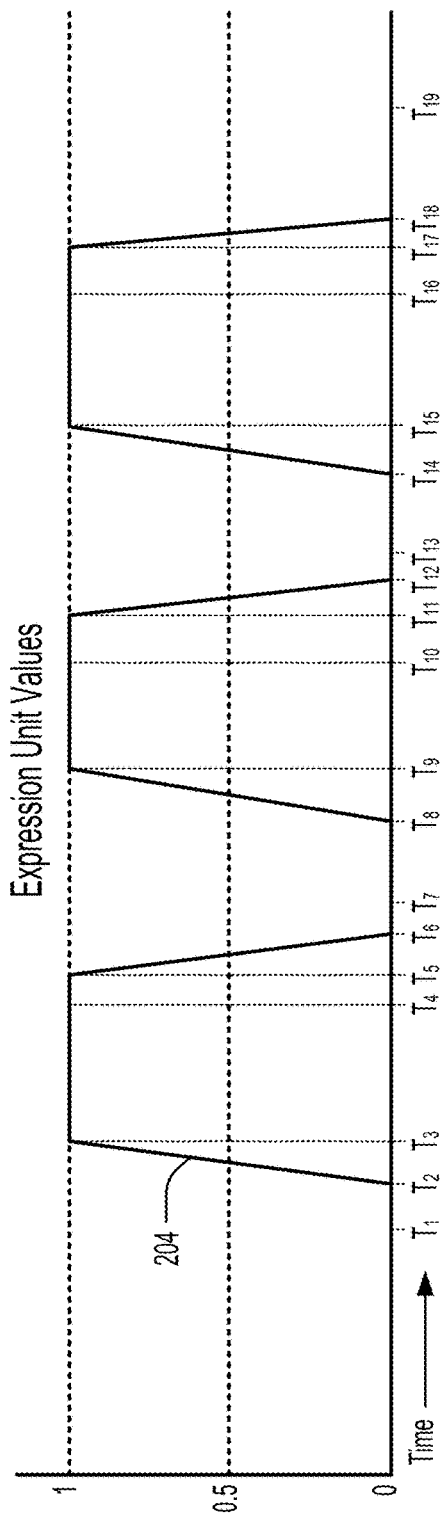

FIGS. 2A and 2B illustrate an example calculation of expression unit values 204 based on movement metric values 202, in accordance with some embodiments of the present invention. As shown in FIG. 2A, relative maximum values 208 and relative minimum values 210 are first identified for movement metric values 202 as well as their corresponding time stamps ($T_1$, $T_4$, $T_7$, $T_{10}$, $T_{13}$, $T_{16}$, and $T_{19}$). To avoid over identification of relative extrema values, a constraint that sequential extrema values have at least a particular spacing (e.g., an amount of time or a number of frames) may be imposed. Next, an upper threshold 212 may be set at a predetermined distance below each of relative maximum values 208, and a lower threshold 214 may be set at a predetermined distance above each of relative minimum values 210. The time stamps at which movement metric values 202 cross upper thresholds 212 ($T_3$, $T_5$, $T_9$, $T_{11}$, $T_{15}$, and $T_{17}$) and lower thresholds 214 ($T_2$, $T_6$, $T_5$, $T_{12}$, $T_{14}$, and $T_{15}$) may be identified.

As shown in FIG. 2B, expression unit values 204 may then be calculated by setting values equal to one at timestamps for which relative maximum values 208 were identified and/or timestamps for which movement metric values 202 cross upper thresholds 212. Expression unit values 204 may be set equal to zero at timestamps for which relative minimum values 210 were identified and/or timestamps for which movement metric values 202 cross lower thresholds 214. The remaining values of expression unit values 204 may be linearly interpolated. For example, expression unit values 204 between $T_2$ and $T_3$ may be linearly interpolated between zero and one, expression unit values 204 between $T_5$ and $T_6$ may be linearly interpolated between one and zero, and the like.

In some embodiments, interpolation schemes other than linear interpolation may be employed. For example, a non-linear interpolation scheme may be employed in which expression unit values are calculated based on the nearest movement metric values as follows. If $M(T_i)$ and $E(T_i)$ are the metric movement value and the expression unit value at time $T_i$, respectively, then the expression unit value between $T_2$ and $T_3$ may be interpolated between zero and one as defined by the following equation:

$$E(T_i) = \frac{M(T_i) - M(T_2)}{M(T_3) - M(T_2)}$$

Similarly, the expression unit value between $T_5$ and $T_6$ may be interpolated between one and zero as defined by the following equation:

$$E(T_i) = \frac{M(T_i) - M(T_6)}{M(T_5) - M(T_6)}$$

FIGS. 3A and 3B illustrate an example calculation of expression unit values 304 based on movement metric values 302, in accordance with some embodiments of the present invention. In contrast to FIGS. 2A and 2B, the expression unit in FIGS. 3A and 3B is one in which minimum movement metric values occur when the user is fully producing the expression unit and maximum movement metric values occur when the user is producing the expression unit at a minimum amount.

As shown in FIG. 3A, relative maximum values 308 and relative minimum values 310 are first identified for movement metric values 302 as well as their corresponding time stamps ($T_1$, $T_4$, $T_7$, $T_{10}$, $T_{13}$, $T_{16}$, and $T_{19}$). Similar to that described in FIG. 2A, an upper threshold 312 may be set at a predetermined distance below each of relative maximum values 308, and a lower threshold 314 may be set at a predetermined distance above each of relative minimum values 310. The time stamps at which movement metric values 302 cross upper thresholds 312 ($T_2$, $T_6$, $T_5$, $T_{12}$, $T_{14}$, and $T_{15}$) and lower thresholds 314 ($T_3$, $T_5$, $T_9$, $T_{11}$, $T_{15}$, and $T_{17}$) may be identified.

As shown in FIG. 3B, expression unit values 304 may then be calculated by setting values equal to zero at timestamps for which relative maximum values 308 were identified and/or timestamps for which movement metric values 302 cross upper thresholds 312. Expression unit values 304 may be set equal to one at timestamps for which relative minimum values 310 were identified and/or timestamps for which movement metric values 302 cross lower thresholds 314. The remaining values of expression unit values 304 may be linearly interpolated.

FIGS. 4A and 4B illustrate an example calculation of expression unit values 404 based on movement metric values 402, in accordance with some embodiments of the present invention. The scheme employed in FIG. 4A is a simplified approach in which the thresholds described in FIGS. 2A and 3A are not used. Similar to FIGS. 2A and 2B, the expression unit in FIGS. 4A and 4B is one in which maximum movement metric values occur when the user is fully producing the expression unit and minimum movement metric values occur when the user is producing the expression unit at a minimum amount. As shown in FIG. 4A, relative maximum values 408 and relative minimum values 410 are identified for movement metric values 402 as well as their corresponding time stamps ($T_1$, $T_4$, $T_7$, $T_{10}$, $T_{13}$, $T_{16}$, and $T_{19}$).

As shown in FIG. 4B, expression unit values 404 may then be calculated by setting values equal to one at timestamps for which relative maximum values 408 were identified and setting values equal to zero at timestamps for which relative minimum values 410 were identified. The remaining values of expression unit values 404 are calculated by linearly or non-linearly interpolating between zero and one between $T_1$ and $T_4$, $T_7$ and $T_{10}$, and $T_{13}$ and $T_{16}$, and between one and zero between $T_4$ and $T_7$, $T_{10}$ and $T_{13}$, and $T_{16}$ and $T_{19}$.

Figure 5A:
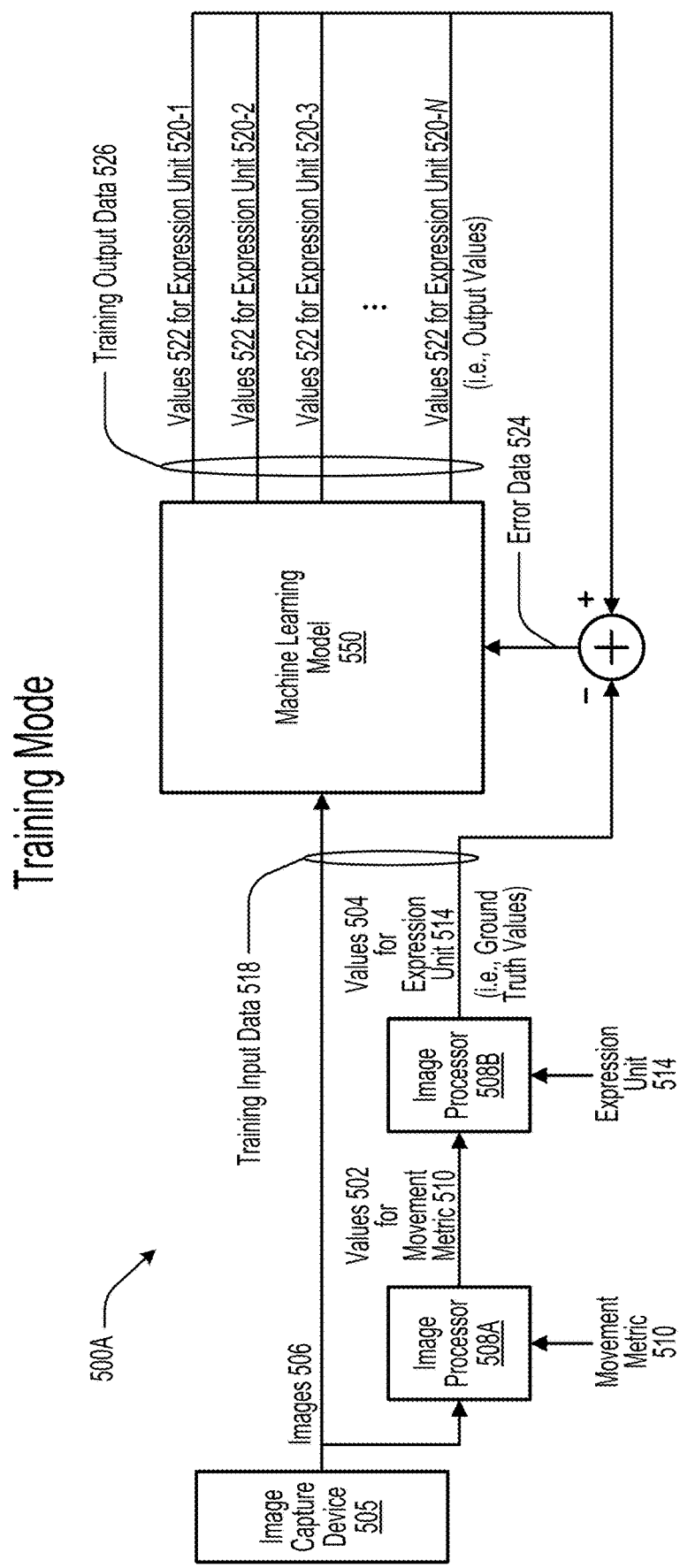
FIG. 5A illustrates an example system in which a machine learning model is operating in a training mode.

FIG. 5A illustrates an example system 500A in which a machine learning model 550 is operating in a training mode, in accordance with some embodiments of the present invention. System 500A includes an image capture device 505 configured to capture images 506 of a user's face. Images 506 are received and processed by image processors 508A and 508B. Image processor 508A calculates values 502 for a movement metric 510. Movement metric 510 may be constant during the training process or may be changed for different expression units. Values 502 for movement metric 510 are sent from image processor 508A to image processor 508B, which calculates values 504 for an expression unit 514 based on values 502 for movement metric 510.

Images 506 and values 504 for expression unit 514 may form training input data 518. During the training process, each of images 506 may be fed sequentially to machine learning model 550 along with the image's corresponding expression unit value from values 504. Upon receiving the image, machine learning model 550 may generate an output value of output values 522 for each of a set of N expression units 520. The output value for the same expression unit as expression unit 514 is compared to the corresponding value from values 504 to generate error data 524. The weights associated with machine learning model 550 are then modified (e.g., adjusted) based on error data 524.

As an example, during a first training iteration, a first image from images 506 may be provided to machine learning model 550, which may generate N outputs values 522 (one output value for each of the N expression units 520). In some embodiments, each of the N output values may be fractional values between zero and one. The output value 522 for the expression unit 520 that is the same as expression unit 514 is compared to a first value from values 504 (representing ground truth) that corresponds to the first image to generate error data 524. In some embodiments, the output values 522 for the remaining expression units 520 are also used to generate error data 524, thereby allowing machine learning model 550 to learn that these output values 522 should be zero. The weights associated with machine learning model 550 are then modified based on error data 524.

Continuing with the example, during a second training iteration after the first training iteration, a second image from images 506 may be provided to machine learning model 550, which may generate N outputs values 522 (one output value for each of the N expression units 520). The output value 522 for the expression unit 520 that is the same as expression unit 514 is compared to a second value from values 504 that corresponds to the second image to generate error data 524 (optionally, the output values 522 for the remaining expression units 520 are also used to generate error data 524). The weights associated with machine learning model 550 are then modified based on error data 524.

This process continues until all of images 506 have been used in the training process. During the training process, expression unit 514 may be changed as needed, causing different output values 522 to be selected and used in the generation of error data 524. Machine learning model 550 may thus "learn" to predict to what extent the user is producing each of the N expression units 520 based on a single image.

Figure 5B:
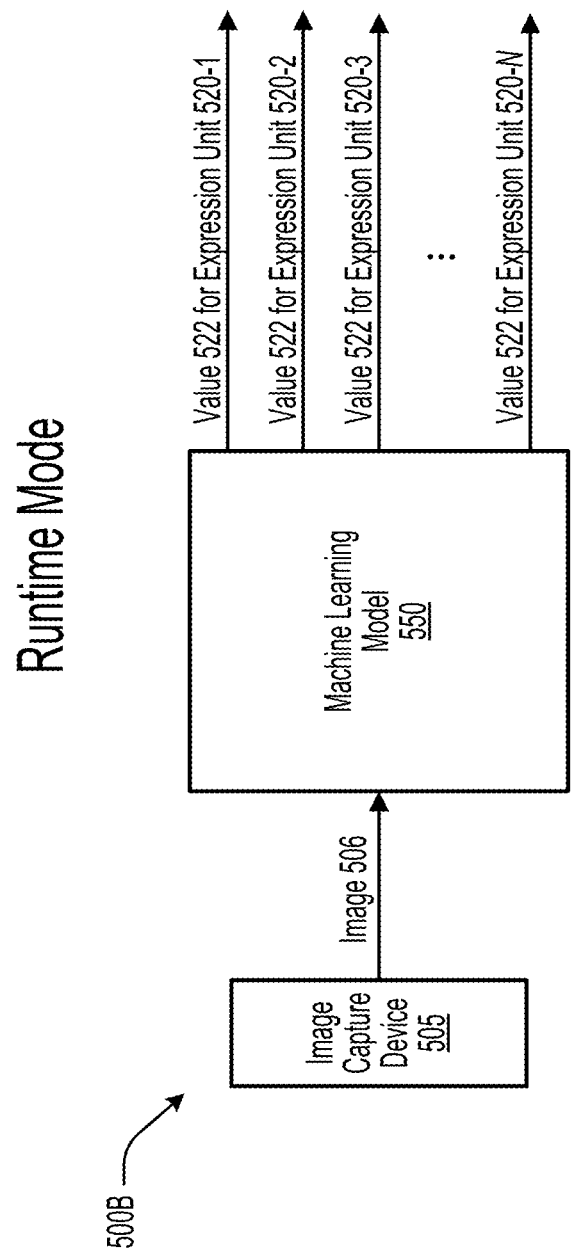
FIG. 5B illustrates an example system in which a machine learning model is operating in a runtime mode.

FIG. 5B illustrates an example system 500B in which machine learning model 550 is operating in a runtime mode, in accordance with some embodiments of the present invention. During runtime, image capture device 505 captures and provides image 506 to machine learning model 550, which generates an output value 522 for each of expression units 520, resulting in N output values 522. While a single input image 506 is shown in FIG. 5B, in some embodiments multiple input images may be provided to increase the accuracy of machine learning model 550. For example, one or more previous images or subsequent images to image 506 may be provided to machine learning model 550 along with image 506 when generating a single set of N values 522. In such embodiments, the training process may similarly utilize multiple input images during each training iteration.

FIG. 6 illustrates an example implementation in which the number of eye pixels in an image is used as the movement metric, in accordance with some embodiments of the present invention. In the illustrated example, a left image 602A and a right image 602B of the user's eye are captured using an image capture device. Each of images 602 is segmented into eye pixels 606 and non-eye pixels 608 (alternatively referred to as non-skin pixels and skin pixels, respectively), as shown in eye segmentation 604. Eye pixels 606 may be further segmented into different regions of the eye, including sclera, iris, and pupil. In some embodiments, an additional machine learning model may be used to generate eye segmentation 604. Such a machine learning model may be trained using labeled images prepared by a user in which the user manually identifies eye pixels 606 and non-eye pixels 608, as well the different regions of the eye.

Figure 7A:
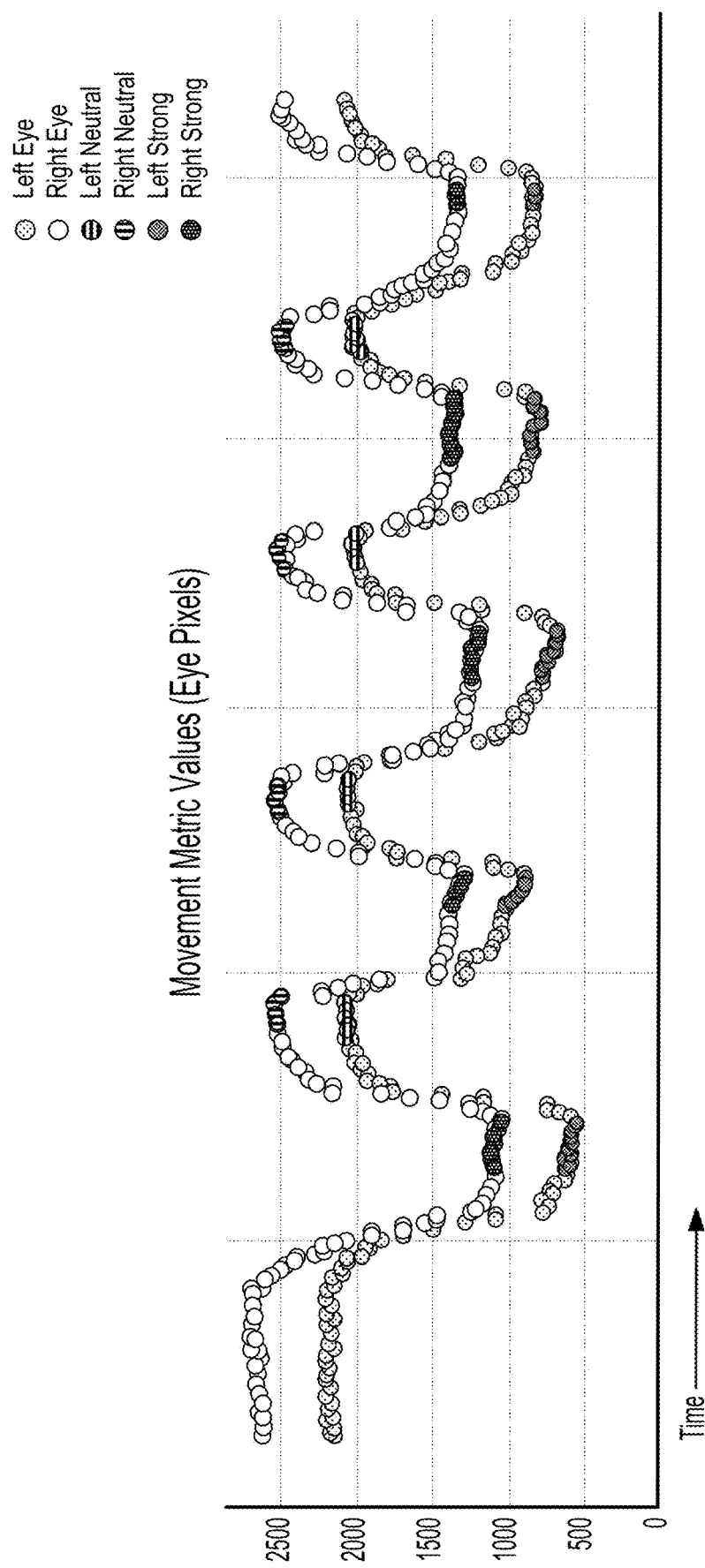
FIG. 7A illustrates example movement metric values for the example implementation of FIG. 6.

FIG. 7A illustrates example movement metric values for the example implementation of FIG. 6 in which the number of eye pixels in an image is used as the movement metric, in accordance with some embodiments of the present invention. In the illustrated example, data for both the left and right eyes are superimposed. The curves show the number of eye pixels (or non-skin pixels) over a period of time. In some embodiments, movement metric values which correspond to "strong expressions" (e.g., user is producing expression unit at maximum extent) may automatically or manually be identified. Automatic identification may be performed by identifying extrema values and optionally thresholds as described in reference to FIGS. 1-4B. Manual identification may be accomplished by a user selecting particular frames through a graphical interface. Additionally, movement metric values which correspond to "neutral expressions" (e.g., user is producing expression unit(s) at a minimum extent) may automatically or manually be identified.

Figure 7B:
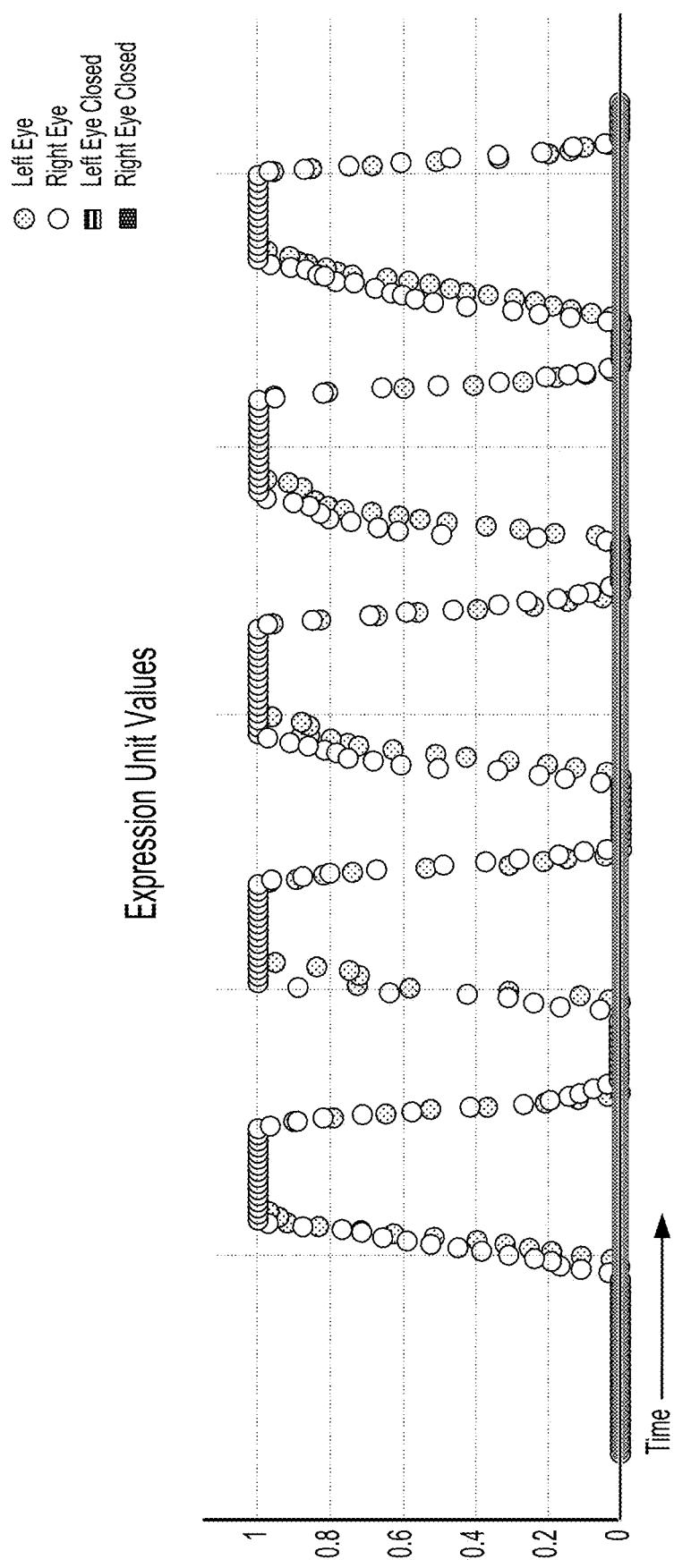
FIG. 7B illustrates example expression unit values for the movement metric values shown in FIG. 7A.

FIG. 7B illustrates example expression unit values for the movement metric values shown in FIG. 7A. Expression unit values are calculated by setting values equal to one for frames (images) at which strong expressions were identified (and optionally frames for which movement metric values are within a threshold distance) and setting values equal to zero for frames at which neutral expressions were identified (and optionally frames for which movement metric values are within a threshold distance). The remaining expression unit values are linearly or non-linearly interpolated between zero and one, as described in reference to FIGS. 2-4B.

Figure 8:
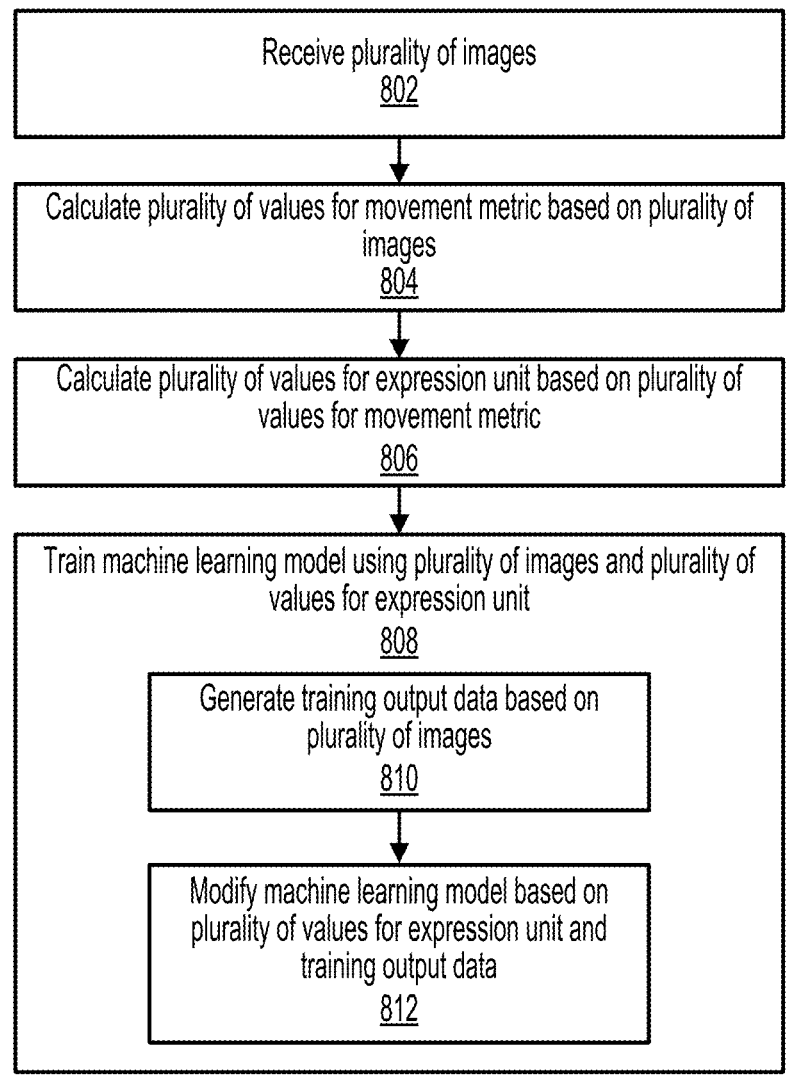
FIG. 8 illustrates a method of training a machine learning model to predict user expression.

FIG. 8 illustrates a method 800 of training a machine learning model (e.g., machine learning model 550) to predict user expression, in accordance with some embodiments of the present invention. One or more steps of method 800 may be omitted during performance of method 800, and steps of method 800 need not be performed in the order shown. One or more steps of method 800 may be performed or facilitated by one or more processors.

At step 802, a plurality of images are received (e.g., images 506, 602). The plurality of images may be received from an image capture device (e.g., image capture device 505), which may capture and send the plurality of images to a processing module. One or more of the plurality of images may be gray scale images, multi-channel images (e.g., RGB images), among other possibilities. In some embodiments, the image capture device may be an eye tracking camera mounted to a wearable device. Each of the plurality of images may contain at least a portion of a user's face. For example, each of the plurality of images may contain the user's eye.

At step 804, a plurality of values (e.g., values 102, 202, 302, 402, 502) for a movement metric (e.g., movement metric 510) are calculated based on the plurality of images. The movement metric may be some measure indicative of movement of the user's face (or from which an analysis thereof may indicate movement of the user's face). For example, the movement metric may be the number of eye pixels in an image, the number of non-eye pixels in the image, the distance between the top and bottom of the eye, the distance between the left and right sides of the eye, the position of a point along the eye within the image, the gradient of the image, among other possibilities.

For embodiments in which the movement metric is the number of eye pixels, calculating the plurality of values for the movement metric may include segmenting each of the plurality of images such that each of the plurality of images includes eye pixels (e.g., eye pixels 606) and non-eye pixels (e.g., non-eye pixels 608), counting the number of eye pixels in each of the plurality of images, and setting each of the plurality of values for the movement metric equal to the number of eye pixels in a corresponding image from the plurality of images. Segmenting an image from the plurality of images may result in an eye segmentation (e.g., eye segmentation 604).

At step 806, a plurality of values (e.g., values 204, 304, 404, 504) for an expression unit (e.g., expression unit 514) are calculated based on the plurality of values for the movement metric. Each of the plurality of values for the expression unit may correspond to the extent to which the user (e.g., the user's face) is producing the expression unit. In some embodiments, greater values may correspond to the user producing the expression unit to a greater extent.

In some embodiments, calculating the plurality of values for the expression unit may include identifying extrema values (maximum and/or minimum values) in the plurality of values for the movement metric. In one example, first extrema values (e.g., maximum values) in the plurality of values for the movement metric are identified along with first corresponding images for which the first extrema values are identified. Each of the plurality of values for the expression unit that are associated with the first corresponding images may be set equal to one. Furthermore, second extrema values (e.g., minimum values) in the plurality of values for the movement metric may be identified along with second corresponding images for which the second extrema values are identified. Each of the plurality of values for the expression unit that are associated with the second corresponding images may be set equal to zero. Furthermore, each remaining value of the plurality of values may be set equal to a value between zero and one through interpolation.

At step 808, the machine learning model is trained using the plurality of images and the plurality of values for the expression unit. In some embodiments, step 808 includes one or both of steps 810 and 812.

At step 810, training output data (e.g., training output data 526) is generated based on the plurality of images. The training output data may include a plurality of output values (e.g., output values 522) for each of a set of expression units (e.g., expression units 520). The expression unit may be one of the set of expression units. The set of expression units may include one or more of the following: inner brow raiser, outer brow raiser, brow lowerer, upper lid raiser, cheek raiser, lid tightener, nose wrinkler, eyes closed, left eye wink, and right eye wink. The set of expression units may be FACS action units such that the expression unit may be one of the FACS action units.

In some embodiments, training the machine learning model using the plurality of images and the plurality of values for the expression unit further includes performing a comparison of the plurality of values for the expression unit to the plurality of output values for the expression unit. In some embodiments, error data (e.g., error data 524) may be generated based on the comparison. For example, the error data may be generated by subtracting the plurality of values for the expression unit from the plurality of output values for the expression unit (or vice versa). The error data may be set equal to the magnitude of the difference, the sum of the magnitudes of the differences, the sum of the square of the differences, among other possibilities. In general, the error data may be indicative of the difference between the plurality of values for the expression unit and the plurality of output values for the expression unit.

At step 812, the machine learning model is modified based on the plurality of values for the expression unit and the training output data. Modifying the machine learning model may include adjusting one or more parameters (e.g., weights and/or biases) associated with the machine learning model. For example, the machine learning model may be an artificial neural network having a plurality of adjustable parameters which are used to compute a set of output values for the set of expression units based on an input image.

In some embodiments, the machine learning model may be modified based on the error data. In some embodiments, the extent to which the parameters associated with the machine learning model are adjusted may be related to (e.g., proportional to) the magnitude of the error data, such that greater differences between the plurality of values for the expression unit and the plurality of output values for the expression unit lead to greater modifications to the machine learning model. In some embodiments, the machine learning model may be modified for each of a plurality of training iterations. For example, each training iteration may consist of training the machine learning model using a single input image from the plurality of images and its corresponding value for the expression unit from the plurality of values for the expression unit.

Figure 9:
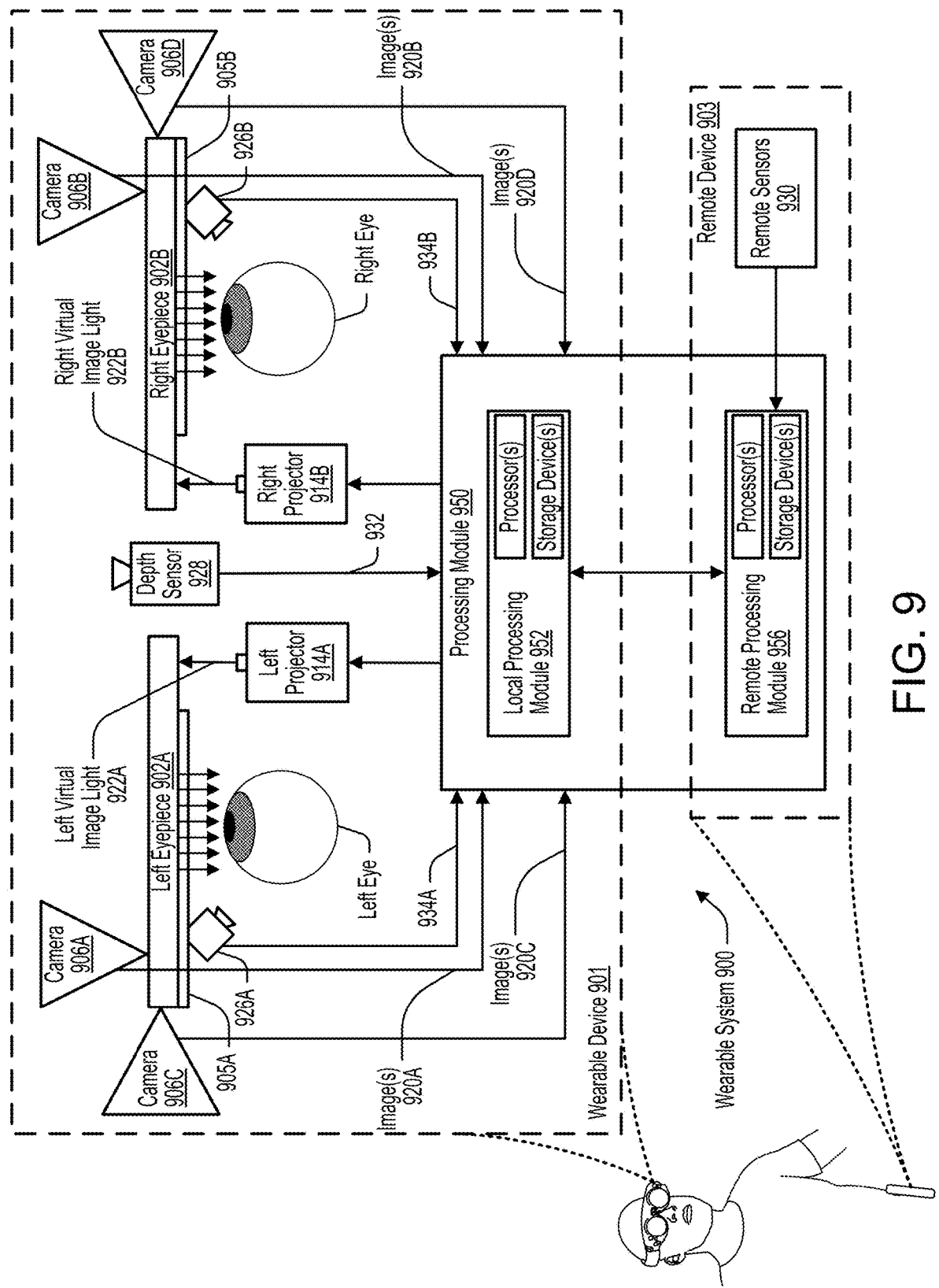
FIG. 9 illustrates a schematic view of an example wearable system.

FIG. 9 illustrates a schematic view of an example wearable system 900 that may be used in one or more of the above-described embodiments, in accordance with some embodiments of the present invention. Wearable system 900 may include a wearable device 901 and at least one remote device 903 that is remote from wearable device 901 (e.g., separate hardware but communicatively coupled). While wearable device 901 is worn by a user (generally as a headset), remote device 903 may be held by the user (e.g., as a handheld controller) or mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Wearable device 901 may include a left eyepiece 902A and a left lens assembly 905A arranged in a side-by-side configuration and constituting a left optical stack. Left lens assembly 905A may include an accommodating lens on the user side of the left optical stack as well as a compensating lens on the world side of the left optical stack. Similarly, wearable device 901 may include a right eyepiece 902B and a right lens assembly 905B arranged in a side-by-side configuration and constituting a right optical stack. Right lens assembly 905B may include an accommodating lens on the user side of the right optical stack as well as a compensating lens on the world side of the right optical stack.

In some embodiments, wearable device 901 includes one or more sensors including, but not limited to: a left front-facing world camera 906A attached directly to or near left eyepiece 902A, a right front-facing world camera 906B attached directly to or near right eyepiece 902B, a left side-facing world camera 906C attached directly to or near left eyepiece 902A, a right side-facing world camera 906D attached directly to or near right eyepiece 902B, a left eye tracking camera 926A directed toward the left eye, a right eye tracking camera 926B directed toward the right eye, and a depth sensor 928 attached between eyepieces 902. Wearable device 901 may include one or more image projection devices such as a left projector 914A optically linked to left eyepiece 902A and a right projector 914B optically linked to right eyepiece 902B.

Wearable system 900 may include a processing module 950 for collecting, processing, and/or controlling data within the system. Components of processing module 950 may be distributed between wearable device 901 and remote device 903. For example, processing module 950 may include a local processing module 952 on the wearable portion of wearable system 900 and a remote processing module 956 physically separate from and communicatively linked to local processing module 952. Each of local processing module 952 and remote processing module 956 may include one or more processing units (e.g., central processing units (CPUs), graphics processing units (GPUs), etc.) and one or more storage devices, such as non-volatile memory (e.g., flash memory).

Processing module 950 may collect the data captured by various sensors of wearable system 900, such as cameras 906, eye tracking cameras 926, depth sensor 928, remote sensors 930, ambient light sensors, microphones, inertial measurement units (IMUs), accelerometers, compasses, Global Navigation Satellite System (GNSS) units, radio devices, and/or gyroscopes. For example, processing module 950 may receive image(s) 920 from cameras 906. Specifically, processing module 950 may receive left front image(s) 920A from left front-facing world camera 906A, right front image(s) 920B from right front-facing world camera 906B, left side image(s) 920C from left side-facing world camera 906C, and right side image(s) 920D from right side-facing world camera 906D. In some embodiments, image(s) 920 may include a single image, a pair of images, a video comprising a stream of images, a video comprising a stream of paired images, and the like. Image(s) 920 may be periodically generated and sent to processing module 950 while wearable system 900 is powered on, or may be generated in response to an instruction sent by processing module 950 to one or more of the cameras.

Cameras 906 may be configured in various positions and orientations along the outer surface of wearable device 901 so as to capture images of the user's surrounding. In some instances, cameras 906A, 906B may be positioned to capture images that substantially overlap with the FOVs of a user's left and right eyes, respectively. Accordingly, placement of cameras 906 may be near a user's eyes but not so near as to obscure the user's FOV. Alternatively or additionally, cameras 906A, 906B may be positioned so as to align with the incoupling locations of virtual image light 922A, 922B, respectively. Cameras 906C, 906D may be positioned to capture images to the side of a user, e.g., in a user's peripheral vision or outside the user's peripheral vision. Image(s) 920C, 920D captured using cameras 906C, 906D need not necessarily overlap with image(s) 920A, 920B captured using cameras 906A, 906B.

In some embodiments, processing module 950 may receive ambient light information from an ambient light sensor. The ambient light information may indicate a brightness value or a range of spatially-resolved brightness values. Depth sensor 928 may capture a depth image 932 in a front-facing direction of wearable device 901. Each value of depth image 932 may correspond to a distance between depth sensor 928 and the nearest detected object in a particular direction. As another example, processing module 950 may receive eye tracking data 934 from eye tracking cameras 926, which may include images of the left and right eyes. As another example, processing module 950 may receive projected image brightness values from one or both of projectors 914. Remote sensors 930 located within remote device 903 may include any of the above-described sensors with similar functionality.

Virtual content is delivered to the user of wearable system 900 using projectors 914 and eyepieces 902, along with other components in the optical stacks. For instance, eyepieces 902A, 902B may comprise transparent or semitransparent waveguides configured to direct and outcouple light generated by projectors 914A, 914B, respectively. Specifically, processing module 950 may cause left projector 914A to output left virtual image light 922A onto left eyepiece 902A, and may cause right projector 914B to output right virtual image light 922B onto right eyepiece 902B. In some embodiments, projectors 914 may include micro-electromechanical system (MEMS) spatial light modulator (SLM) scanning devices. In some embodiments, each of eyepieces 902A, 902B may comprise a plurality of waveguides corresponding to different colors. In some embodiments, lens assemblies 905A, 905B may be coupled to and/or integrated with eyepieces 902A, 902B. For example, lens assemblies 905A, 905B may be incorporated into a multi-layer eyepiece and may form one or more layers that make up one of eyepieces 902A, 902B.

Figure 10:
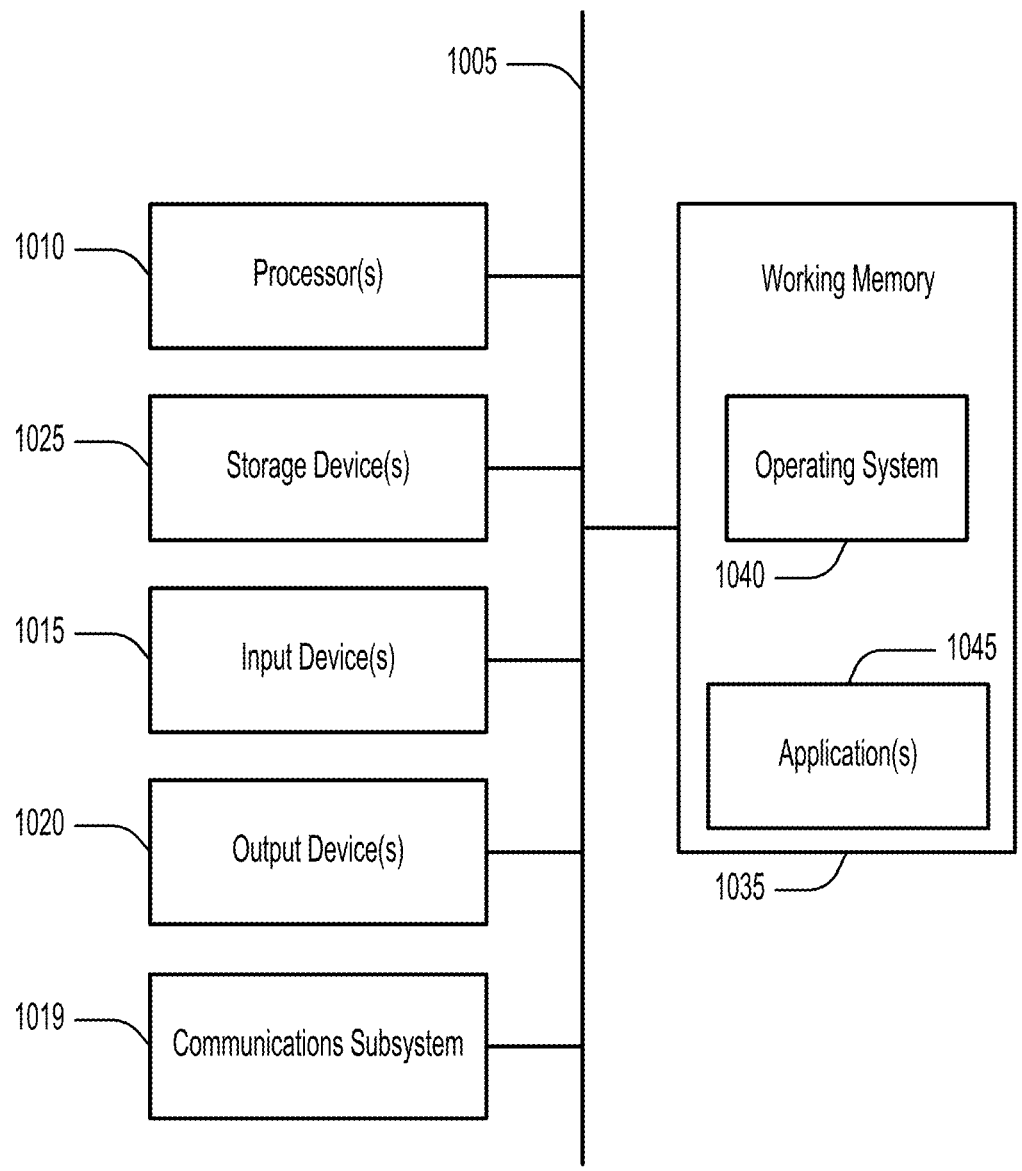
FIG. 10 illustrates a simplified computer system.

FIG. 10 illustrates a simplified computer system 1000 according to an embodiment described herein. Computer system 1000 as illustrated in FIG. 10 may be incorporated into devices described herein. FIG. 10 provides a schematic illustration of one embodiment of computer system 1000 that can perform some or all of the steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

Computer system 1000 is shown comprising hardware elements that can be electrically coupled via a bus 1005, or may otherwise be in communication, as appropriate. The hardware elements may include one or more processors 1010, including without limitation one or more general-purpose processors and/or one or more special-purpose processors such as digital signal processing chips, graphics acceleration processors, and/or the like; one or more input devices 1015, which can include without limitation a mouse, a keyboard, a camera, and/or the like; and one or more output devices 1020, which can include without limitation a display device, a printer, and/or the like.

Computer system 1000 may further include and/or be in communication with one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1000 might also include a communications subsystem 1019, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1019 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1019. In other embodiments, a portable electronic device, e.g. the first electronic device, may be incorporated into computer system 1000, e.g., an electronic device as an input device 1015. In some embodiments, computer system 1000 will further comprise a working memory 1035, which can include a RAM or ROM device, as described above.

Computer system 1000 also can include software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or conFIG. systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to conFIG. and/or adapt a general purpose computer or other device to perform one or more operations in accordance with the described methods.

A set of these instructions and/or code may be stored on a non-transitory computer-readable storage medium, such as the storage device(s) 1025 described above. In some cases, the storage medium might be incorporated within a computer system, such as computer system 1000. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1000 and/or might take the form of source and/or installable code, which, upon compilation and/or installation on computer system 1000 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1000 to perform methods in accordance with various embodiments of the technology. According to a set of embodiments, some or all of the procedures of such methods are performed by computer system 1000 in response to processor 1010 executing one or more sequences of one or more instructions, which might be incorporated into the operating system 1040 and/or other code, such as an application program 1045, contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1000.

The communications subsystem 1019 and/or components thereof generally will receive signals, and the bus 1005 then might carry the signals and/or the data, instructions, etc. carried by the signals to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of training a machine learning model to predict user expression, the method comprising:
   receiving a plurality of images, each of the plurality of images containing at least a portion of a user's face;
   calculating a plurality of values for a movement metric based on the plurality of images, each of the plurality of values for the movement metric being indicative of movement of the user's face;
   calculating a plurality of values for an expression unit based on the plurality of values for the movement metric, each of the plurality of values for the expression unit corresponding to an extent to which the user's face is producing the expression unit; and
   training the machine learning model using the plurality of images and the plurality of values for the expression unit by:
      generating, by the machine learning model, training output data based on the plurality of images; and
      modifying the machine learning model based on the plurality of values for the expression unit and the training output data.

2. The method of claim 1, wherein the training output data includes a plurality of output values for each of a set of expression units, the expression unit being a first expression unit from the set of expression units.

3. The method of claim 2, wherein the set of expression units includes at least one of: inner brow raiser, outer brow raiser, brow lowerer, upper lid raiser, cheek raiser, lid tightener, nose wrinkler, eyes closed, left eye wink, or right eye wink.

4. The method of claim 1, wherein training the machine learning model using the plurality of images and the plurality of values for the expression unit further includes:
performing a comparison of the plurality of values for the expression unit to a plurality of output values for the expression unit of the training output data; and
generating error data based on the comparison, wherein the machine learning model is modified based on the error data.

5. The method of claim 1, wherein the machine learning model is an artificial neural network having a set of adjustable parameters.

6. The method of claim 1, wherein the movement metric is a number of eye pixels, and wherein calculating the plurality of values for the movement metric based on the plurality of images includes:
segmenting each of the plurality of images such that each of the plurality of images includes eye pixels and non-eye pixels;
counting the number of eye pixels in each of the plurality of images; and
setting each of the plurality of values for the movement metric equal to the number of eye pixels in a corresponding image from the plurality of images.

7. The method of claim 1, wherein calculating the plurality of values for the expression unit based on the plurality of values for the movement metric includes:
identifying first extrema values in the plurality of values for the movement metric and first corresponding images for which the first extrema values are identified;
setting each of the plurality of values for the expression unit that are associated with the first corresponding images equal to one;
identifying second extrema values in the plurality of values for the movement metric and second corresponding images for which the second extrema values are identified;
setting each of the plurality of values for the expression unit that are associated with the second corresponding images equal to zero; and
setting each remaining value of the plurality of values by interpolating between zero and one.

8. A non-transitory computer-readable medium comprising instructions that, when executed by one or more processors, cause the one or more processors to perform operations comprising:
receiving a plurality of images, each of the plurality of images containing at least a portion of a user's face;
calculating a plurality of values for a movement metric based on the plurality of images, each of the plurality of values for the movement metric being indicative of movement of the user's face;
calculating a plurality of values for an expression unit based on the plurality of values for the movement metric, each of the plurality of values for the expression unit corresponding to an extent to which the user's face is producing the expression unit; and
training a machine learning model using the plurality of images and the plurality of values for the expression unit by:
generating, by the machine learning model, training output data based on the plurality of images; and
modifying the machine learning model based on the plurality of values for the expression unit and the training output data.

9. The non-transitory computer-readable medium of claim 8, wherein the training output data includes a plurality of output values for each of a set of expression units, the expression unit being a first expression unit from the set of expression units.

10. The non-transitory computer-readable medium of claim 9, wherein the set of expression units includes at least one of: inner brow raiser, outer brow raiser, brow lowerer, upper lid raiser, cheek raiser, lid tightener, nose wrinkler, eyes closed, left eye wink, or right eye wink.

11. The non-transitory computer-readable medium of claim 8, wherein training the machine learning model using the plurality of images and the plurality of values for the expression unit further includes:
performing a comparison of the plurality of values for the expression unit to a plurality of output values for the expression unit of the training output data; and
generating error data based on the comparison, wherein the machine learning model is modified based on the error data.

12. The non-transitory computer-readable medium of claim 8, wherein the machine learning model is an artificial neural network having a set of adjustable parameters.

13. The non-transitory computer-readable medium of claim 8, wherein the movement metric is a number of eye pixels, and wherein calculating the plurality of values for the movement metric based on the plurality of images includes:
segmenting each of the plurality of images such that each of the plurality of images includes eye pixels and non-eye pixels;
counting the number of eye pixels in each of the plurality of images; and
setting each of the plurality of values for the movement metric equal to the number of eye pixels in a corresponding image from the plurality of images.

14. The non-transitory computer-readable medium of claim 8, wherein calculating the plurality of values for the expression unit based on the plurality of values for the movement metric includes:
identifying first extrema values in the plurality of values for the movement metric and first corresponding images for which the first extrema values are identified;
setting each of the plurality of values for the expression unit that are associated with the first corresponding images equal to one;
identifying second extrema values in the plurality of values for the movement metric and second corresponding images for which the second extrema values are identified;
setting each of the plurality of values for the expression unit that are associated with the second corresponding images equal to zero; and
setting each remaining value of the plurality of values by interpolating between zero and one.

15. A system comprising:
one or more processors; and
a non-transitory computer-readable medium comprising instructions that, when executed by the one or more processors, cause the one or more processors to perform operations comprising:
receiving a plurality of images, each of the plurality of images containing at least a portion of a user's face;
calculating a plurality of values for a movement metric based on the plurality of images, each of the plurality of values for the movement metric being indicative of movement of the user's face;
calculating a plurality of values for an expression unit based on the plurality of values for the movement metric, each of the plurality of values for the expression unit corresponding to an extent to which the user's face is producing the expression unit; and
training a machine learning model using the plurality of images and the plurality of values for the expression unit by:
generating, by the machine learning model, training output data based on the plurality of images; and
modifying the machine learning model based on the plurality of values for the expression unit and the training output data.

16. The system of claim 15, wherein the training output data includes a plurality of output values for each of a set of expression units, the expression unit being a first expression unit from the set of expression units.

17. The system of claim 16, wherein the set of expression units includes at least one of: inner brow raiser, outer brow raiser, brow lowerer, upper lid raiser, cheek raiser, lid tightener, nose wrinkler, eyes closed, left eye wink, or right eye wink.

18. The system of claim 15, wherein training the machine learning model using the plurality of images and the plurality of values for the expression unit further includes:
performing a comparison of the plurality of values for the expression unit to a plurality of output values for the expression unit of the training output data; and
generating error data based on the comparison, wherein the machine learning model is modified based on the error data.

19. The system of claim 15, wherein the movement metric is a number of eye pixels, and wherein calculating the plurality of values for the movement metric based on the plurality of images includes:
segmenting each of the plurality of images such that each of the plurality of images includes eye pixels and non-eye pixels;
counting the number of eye pixels in each of the plurality of images; and
setting each of the plurality of values for the movement metric equal to the number of eye pixels in a corresponding image from the plurality of images.

20. The system of claim 15, wherein calculating the plurality of values for the expression unit based on the plurality of values for the movement metric includes:
identifying first extrema values in the plurality of values for the movement metric and first corresponding images for which the first extrema values are identified;
setting each of the plurality of values for the expression unit that are associated with the first corresponding images equal to one;
identifying second extrema values in the plurality of values for the movement metric and second corresponding images for which the second extrema values are identified;
setting each of the plurality of values for the expression unit that are associated with the second corresponding images equal to zero; and
setting each remaining value of the plurality of values by interpolating between zero and one.

* * * * *